United States Patent
Signaroldi et al.

(10) Patent No.: US 7,189,028 B1
(45) Date of Patent: **\*Mar. 13, 2007**

(54) UNDERWATER PIPE-LAYING

(75) Inventors: Teresio Signaroldi, Sordio (IT); Stefano Bianchi, Cernusco sul Naviglio (IT)

(73) Assignee: Saipem, S.p.A., Milanese (IT)

( * ) Notice: Subject to any disclaimer, the term of this patent is extended or adjusted under 35 U.S.C. 154(b) by 0 days.

This patent is subject to a terminal disclaimer.

(21) Appl. No.: 10/031,411

(22) PCT Filed: Jul. 21, 1999

(86) PCT No.: PCT/EP99/05202

§ 371 (c)(1),
(2), (4) Date: Apr. 18, 2002

(87) PCT Pub. No.: WO01/07812

PCT Pub. Date: Feb. 1, 2001

(51) Int. Cl.
*F16L 1/12* (2006.01)

(52) U.S. Cl. .................. 405/166; 405/168.4; 405/170
(58) Field of Classification Search ................ 405/166, 405/167, 158, 168.4, 170, 154.1
See application file for complete search history.

(56) References Cited

U.S. PATENT DOCUMENTS

| | | | |
|---|---|---|---|
| 1,220,189 A | 9/1917 | Chapman | |
| 2,215,460 A | 9/1940 | Childress | |
| 3,266,256 A | 8/1966 | Postewaite et al. | |
| 3,389,563 A | 6/1968 | Postewaite et al. | |
| 3,440,826 A | 4/1969 | Kline | |
| 3,524,326 A | 8/1970 | Craste | |
| 3,555,835 A | 1/1971 | Smith | |
| 3,581,506 A | 6/1971 | Howard | |
| 3,585,806 A | 6/1971 | Lawrence | |
| 3,668,878 A * | 6/1972 | Jones et al. | 405/167 |
| 3,680,322 A | 8/1972 | Nolan, Jr. et al. | |
| 3,777,115 A | 12/1973 | Kazlauskas et al. | |
| 3,800,116 A | 3/1974 | Tanaka et al. | |
| 3,802,209 A | 4/1974 | Weaver | |
| 3,860,122 A | 1/1975 | Cernosek | |
| 3,974,356 A | 8/1976 | Nelson et al. | |

(Continued)

FOREIGN PATENT DOCUMENTS

DE  2 118 360  10/1971

(Continued)

OTHER PUBLICATIONS

US Patent and Trademark Office, Classification Schedule, Bearings, 83 pages.*

(Continued)

*Primary Examiner*—Katherine Mitchell
(74) *Attorney, Agent, or Firm*—Buchanan Ingersoll & Rooney PC

(57) ABSTRACT

A pipe-laying vessel includes an upwardly extending tower (14) assembly defining a path down which the pipe passes as a pipeline (40) is being laid by the vessel, and a lower guide arrangement for guiding the pipeline after it has passed down the tower, the lower guide arrangement (61) including a plurality of sets of guide rollers spaced apart along the path of the pipeline and defining the lateral limits of the path, the guide rollers being located such that they allow some bending of the pipeline as it passes through the lower guide arrangement.

18 Claims, 13 Drawing Sheets

U.S. PATENT DOCUMENTS

| | | | |
|---|---|---|---|
| 4,068,490 A | 1/1978 | Jegousse | |
| 4,112,698 A | 9/1978 | Lammert et al. | |
| 4,141,667 A * | 2/1979 | Brown | 405/161 |
| 4,145,593 A | 3/1979 | Merrick et al. | |
| 4,151,395 A | 4/1979 | Kushner et al. | |
| 4,234,268 A | 11/1980 | Scodino | |
| 4,283,617 A | 8/1981 | Merrick et al. | |
| 4,345,855 A * | 8/1982 | Uyeda et al. | 405/168.3 |
| 4,350,868 A | 9/1982 | Takagi et al. | |
| 4,373,125 A | 2/1983 | Kazlauskas | |
| 4,380,695 A | 4/1983 | Nelson | |
| 4,417,126 A | 11/1983 | Kasahara et al. | |
| 4,441,011 A | 4/1984 | Nomura et al. | |
| 4,444,528 A | 4/1984 | Scodino et al. | |
| 4,485,291 A | 11/1984 | Nomura et al. | |
| 4,486,123 A | 12/1984 | Koch et al. | |
| 4,495,400 A | 1/1985 | Thompson | |
| 4,525,616 A | 6/1985 | Slavens | |
| 4,591,294 A | 5/1986 | Foulkes | |
| 4,631,386 A | 12/1986 | Slavens | |
| 4,721,410 A * | 1/1988 | Recalde | 405/168.3 |
| 4,765,776 A | 8/1988 | Howson | |
| 4,822,230 A | 4/1989 | Slettedal | |
| 4,834,604 A | 5/1989 | Brittain et al. | |
| 4,854,400 A | 8/1989 | Simpson | |
| 4,865,359 A | 9/1989 | Roberts | |
| 4,986,697 A * | 1/1991 | Lynch | 405/165 |
| 4,990,743 A | 2/1991 | Kugai et al. | |
| 5,030,812 A | 7/1991 | Sugitani et al. | |
| 5,126,523 A | 6/1992 | Rinaldi | |
| 5,146,064 A | 9/1992 | Poirier | |
| 5,347,101 A | 9/1994 | Brennan et al. | |
| 5,421,675 A | 6/1995 | Brown et al. | |
| 5,464,307 A | 11/1995 | Wilkins | |
| 6,124,566 A | 9/2000 | Belloni et al. | |
| 6,273,643 B1 * | 8/2001 | Baugh | 405/166 |
| 6,352,388 B1 * | 3/2002 | Seguin | 405/166 |
| 6,361,250 B1 * | 3/2002 | de Varax | 405/158 |
| 6,429,405 B2 | 8/2002 | Belloni et al. | |
| 6,524,030 B1 * | 2/2003 | Giovannini et al. | 405/166 |

FOREIGN PATENT DOCUMENTS

| | | | |
|---|---|---|---|
| DE | 2118360 | | 10/1971 |
| DE | 1 625 957 | | 4/1972 |
| DE | 21183606 | * | 11/1997 |
| EP | 0 021 856 A1 | | 1/1981 |
| EP | 0 262 545 A1 | | 3/1983 |
| EP | 0 076 018 A1 | | 4/1983 |
| EP | 0 271 184 A1 | | 6/1988 |
| EP | 0 402 648 A2 | | 12/1990 |
| EP | 0 439 975 A1 | | 8/1991 |
| EP | 0 706 849 A1 | | 4/1996 |
| EP | 0 852 984 A1 | | 7/1998 |
| EP | 0 661 488 B1 | | 6/1999 |
| EP | 0 657 670 B1 | | 10/1999 |
| GB | 1107541 | | 3/1968 |
| GB | 1178219 | | 1/1970 |
| GB | 2 095 787 A | | 10/1982 |
| GB | 2 204 106 A | | 11/1988 |
| GB | 2 258 030 A | | 1/1993 |
| JP | 59-191575 | | 10/1984 |
| JP | 62-118976 | | 5/1987 |
| NZ | 330 519 | | 10/1998 |
| WO | 91/09700 | | 7/1991 |

OTHER PUBLICATIONS

USPTO Classification Schedule, 6 pages, dated Dec. 1996.*

D. Koenig et al., "Deepwater Pipelaying Method With a New Welding Technique and J-Curved Pipestring", Offshore Technology Conference, 1979, OTC 3522, pp. 1417-1426, three pages of drawings.

Harry van der Heijden et al., "Installation of an Internally Clad Pipeline Using the J-Lay Method", Offshore Technology Conference, 1992, OTC 7016, pp. 311-318.

S.P. Springmann et al., "Deepwater Pipelaying Operations and Techniques Utilizing J-Lay Methods", Offshore Technology Conference, 1994, OTC 7559, pp. 439-448.

Offshore Engineer, Jul. 1993, pp. 12-15.

Offshore Engineer, Aug. 1992, p. 110.

Offshore Engineer, Mar. 1992, p. 41.

Offshore Engineer, incorporating Northern Offshore, Feb. 1992, pp. 14-16.

Offshore Engineer, The Oilman, Jan. 1992, vol. 52, No. 1, International Edition, p. 66.

Offshore Engineer, The Oilman, Apr. 1989, vol. 49, No. 4, International Edition, p. 18.

Offshore Engineer, incorporating The Oilman, Oct. 1989, vol. 49, No. 10, International Edition, p. 47.

The Oilman, Jul. 1991, p. 64.

"Pipe Handling Systems", Varco BJ Drilling Systems, pp. 1-29.

Notice of Opposition to EP (UK) 0 661 488, "Apparatus for Near Vertical Laying Of Pipeline", filed Mar. 22, 2000.

Notice of Opposition to EP (UK) 0 657 670, "Apparatus for Near Vertical Laying of Pipeline", filed Jul. 26, 2000.

U.S. Appl. No. 10/361,856—"Underwater Pipe-Laying", Umberto Giovannini et al.

* cited by examiner

Fig.11.
Fig.12.
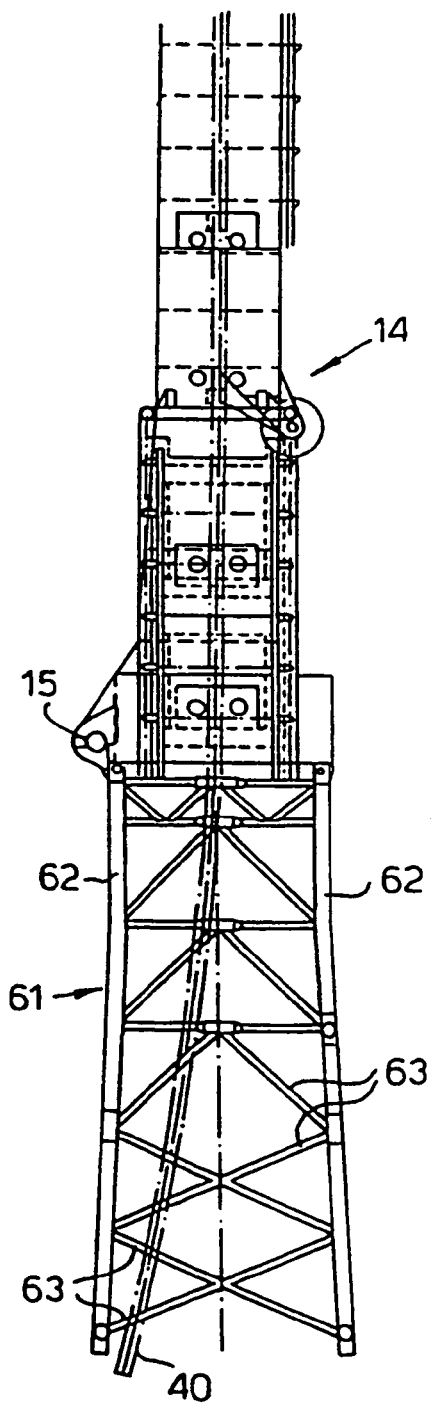
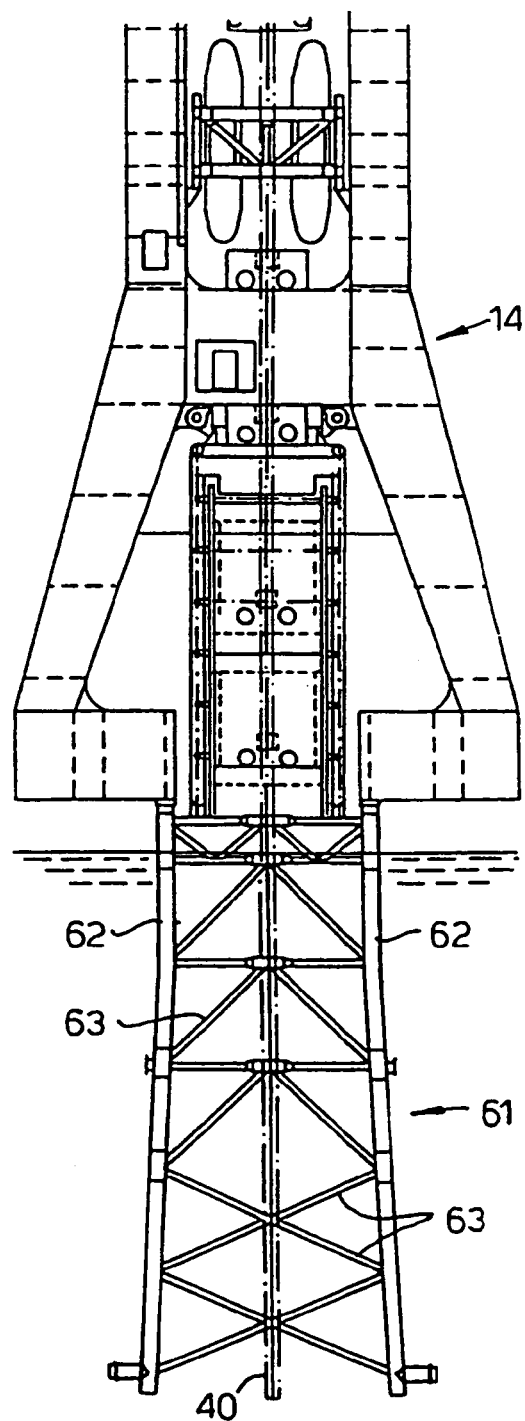

UNDERWATER PIPE-LAYING

The invention relates to a pipe-laying vessel and to a method of laying a pipeline.

The technique mainly used up to now to lay pipelines in the sea is that called "S laying". This technique can be described briefly as follows. The pipe joints, generally 12 meters long, are transported from a port to a lay-barge by means of supply barges or supply vessels, and are loaded onto the deck of the lay-barge. Those pipe joints are added one after the other along a construction ramp, which is usually horizontal or in some cases has a small inclination of 5 or 10 degrees (this ramp being called the "firing line"). On the firing line the operations necessary to complete the connection of the pipe joints are performed in several working stations in order to build a continuous pipeline. When a new joint is added, the barge moves forward and the pipeline, supported at the stern of the lay-barge by an inclined ramp (or floating stinger) curves over the stern of the barge down toward the seabed. The profile of the pipeline, from the lay-vessel to the seabed, is in the form of a long "S" (from which comes the term "S lay"). The upper part of the profile is called the "over-bend", and the lower part is called the "sag-bend". In order to reduce the stresses on the suspended part of the sealine on its way from the lay-vessel to the sea bottom, a constant tension is maintained on the pipeline by means of machines called tensioners. There is a maximum to the depth of water in which that method can be used. As the water depth increases, the tensioner pull necessary to maintain the pipe stress within acceptable values increases dramatically, and the horizontal bollard pull on the lay vessel increases correspondingly. A method to reduce the above-mentioned pulls consists of increasing the angle of descent of the sealine in to the sea. If the angle is close to vertical (called "J lay") the necessary tension on the pipe is very close to the weight of a length of the sealine string equal to the water depth, and the horizontal component is close to zero. This method has the contrary limitation that there is a minimum to the depth of water in which it can be used, because the pipeline must have room to curve through about 90° to lie on the seabed, and if the pipeline is too tightly curved it will be over-stressed.

The problem of over-stressing of the pipeline, especially when it is relatively inflexible, when using a J laying technique has restricted the use that can be made of J laying and more particularly limited the conditions under which J laying has proved a suitable technique.

It is an object of the invention to provide a pipe-laying vessel and a method of laying a pipeline in which the problem of over-stressing the pipeline when J laying is reduced, thereby permitting the effective use of J laying in a wider range of conditions.

According to the invention there is provided a pipe-laying vessel including an upwardly extending tower assembly defining a path down which the pipe passes as a pipeline is being laid by the vessel, and a lower guide arrangement for guiding the pipeline after it has passed down the tower, the lower guide arrangement including a plurality of sets of guide rollers spaced apart along the path of the pipeline and defining the lateral limits of the path, the guide rollers being located such that they allow some bending of the pipeline as it passes through the lower guide arrangement.

By allowing bending of the pipeline as it leaves the vessel and controlling the bending of the pipeline the likelihood of over-stressing the pipeline as it leaves the vessel is reduced. It becomes possible to arrange for the horizontal forces applied to the pipeline by the vessel during laying to be spread between the various sets of guide rollers, so that the stresses introduced at any one set of guide rollers are reduced.

It will usually be preferable for the guide rollers to be of cylindrical shape, but other shapes can be adopted if desired and it is even possible for revolving tracks to be provided around some or all of the rollers, should that be desired for some reason.

Preferably the guide rollers of at least one set of rollers include rollers whose axes of rotation, in a plane perpendicular to the tower, are inclined to one another. In that case the guide rollers surround, at least to some extent, the pipeline and, thereby, allow for some variation between the alignment of the vessel and tower assembly on the one hand and the vertical plane containing the undersea pipeline being laid on the other hand. Preferably the guide rollers of at least one set of rollers extend at least one quarter of a revolution around the path of the pipeline; that allows for a variation of about 90 degrees between the alignment of the vessel/tower assembly on the one hand and the undersea pipeline on the other hand. More preferably the guide rollers of at least one set of rollers extend substantially all around the path of the pipeline; the guide arrangement is then operative for all orientations of the vessel relative to the undersea pipeline.

The lower guide arrangement is preferably of substantially trumpet shape flaring outwardly in the direction of travel of the pipeline during laying, the angle of flare increasing in the direction of travel of the pipeline during laying. In that case, whichever region of the guide arrangement is acting to guide the pipeline as it is being laid, has the effect of introducing a controlled bend into the pipeline and forces applied to the pipeling are spread between rollers of various sets.

Whilst it is within the scope of the invention for the guide rollers to fulfill some tensioning purpose, it is preferred that the guide rollers are freely rotatable so that substantially the only force applied to the pipeline by the guide rollers is a lateral force.

At least some of the rollers are preferably mounted for rotation on bearings that are directly or indirectly resiliently displaceable. It is advantageous to provide the resilience by allowing the axis of rotation of the roller to change resiliently rather than by, for example, providing a resilient roller structure so that the effective direction of the roller changes. It is possible for each roller to be mounted individually for resilient displacement but preferably a whole set of rollers is mounted on a structure that is resiliently displaceable.

The invention is of particular relevance to the laying of a relatively rigid pipeline rather than, for example, a pipeline that is so flexible it can be curved into reels for storage. Preferably the resistance of the bearings to resilient displacement is more than 100 kN/m, and more preferably more than 500 kN/m. In an embodiment of the invention described below, the resistance to displacement is of the order of 500 kN/m in the case of certain higher sets of rollers and of the order of 1000 kN/m in the case of certain lower sets of rollers.

The bearings are preferably resiliently displaceable by a distance of more than 50 mm and preferably at least some of the bearings are resiliently displaceable by a distance of more than 100 mm. In an embodiment of the invention described below, the higher sets of rollers with a resistance to displacement of 5000 kN/m are able to be displaced 100 mm and the lower sets of rollers with a resistance to displacement of 1000 kN/m are able to be displaced 300 mm.

As will be appreciated, the amount of bending introduced into the pipeline during its passage through the lower guide arrangement may be small. One purpose of introducing the bend is to enable the horizontal forces between the guide rollers and the pipeline to be distributed evenly between the sets of rollers. In an embodiment of the invention described below, the amount of bending of the pipeline is of the order of 0.34 m per 10 m length of pipeline; in that embodiment the total force applied by the lower guide arrangement under normal conditions is about 100 kN.

The inclination of the tower assembly is preferably adjustable so that the angle of laying the pipeline can be adjusted, for example according to the depth of laying. The lower guide arrangement is preferably secured to the tower assembly; it is then automatically adjusted with the tower assembly. The inclination of the tower assembly may be fixed, for example, in a vertical position. The inclination of the tower assembly during use is preferably in the range of 45° to 90° to the horizontal.

Preferably three or more sets of guide rollers, and more preferably five or more sets of guide rollers, are positioned along the path of the pipeline below sea level. Some sets of guide rollers are preferably also positioned along the path of the pipeline above sea level; bending of the pipeline is then able to begin above sea level and, in the case where the tower is pivotable, even above the axis of pivoting of the tower. Preferably the sets of rollers are spaced apart substantially evenly along the path of the pipeline. The spacing along the path of the pipeline between adjacent sets of guide rollers is preferably in the range of 2 m to 15 m and more preferably in the range of 3 m to 10 m. In an embodiment of the invention described below, the spacing is about 5 m.

Preferably the vessel includes means for monitoring the forces applied to the pipeline by the rollers of the lower guide arrangement. Preferably a plurality of force monitoring means are associated with respective sets of guide rollers for monitoring the forces applied to the pipeline by the respective sets of guide rollers. The monitoring means may comprise a plurality of load cells.

The vessel may include means for raising lengths of pipe from a deck of the vessel to a position aligned with the tower assembly and for joining such lengths of pipe to the pipeline being laid.

According to the invent-ion there is also provided a method of laying a pipeline from a vessel, comprising lowering the pipeline down an upwardly extending tower assembly of the vessel and then through a lower guide arrangement, the lower guide arrangement including a plurality of sets of: guide rollers spaced apart along the path of the pipeline and defining the lateral limits of the pipeline, the pipeline undergoing some bending as it passes through the lower guide arrangement.

The vessel employed in the method of the invention may be in any of the forms defined above.

Preferably, forces exerted on the pipeline by one or more of the guide rollers are monitored and the operation of the vessel adjusted in dependence upon the monitoring.

Certain forms of pipe-laying vessel will now be described by way of example with reference to the accompanying drawings, in which:

FIG. 11 is a side elevation view of the lower portion of a tower similar to that shown in FIGS. 5 to 10 but including a modified form of lower guide arrangement for the pipeline;

FIG. 12 is an end elevation view of the lower portion of the tower shown in FIG. 11;

Figure 1:
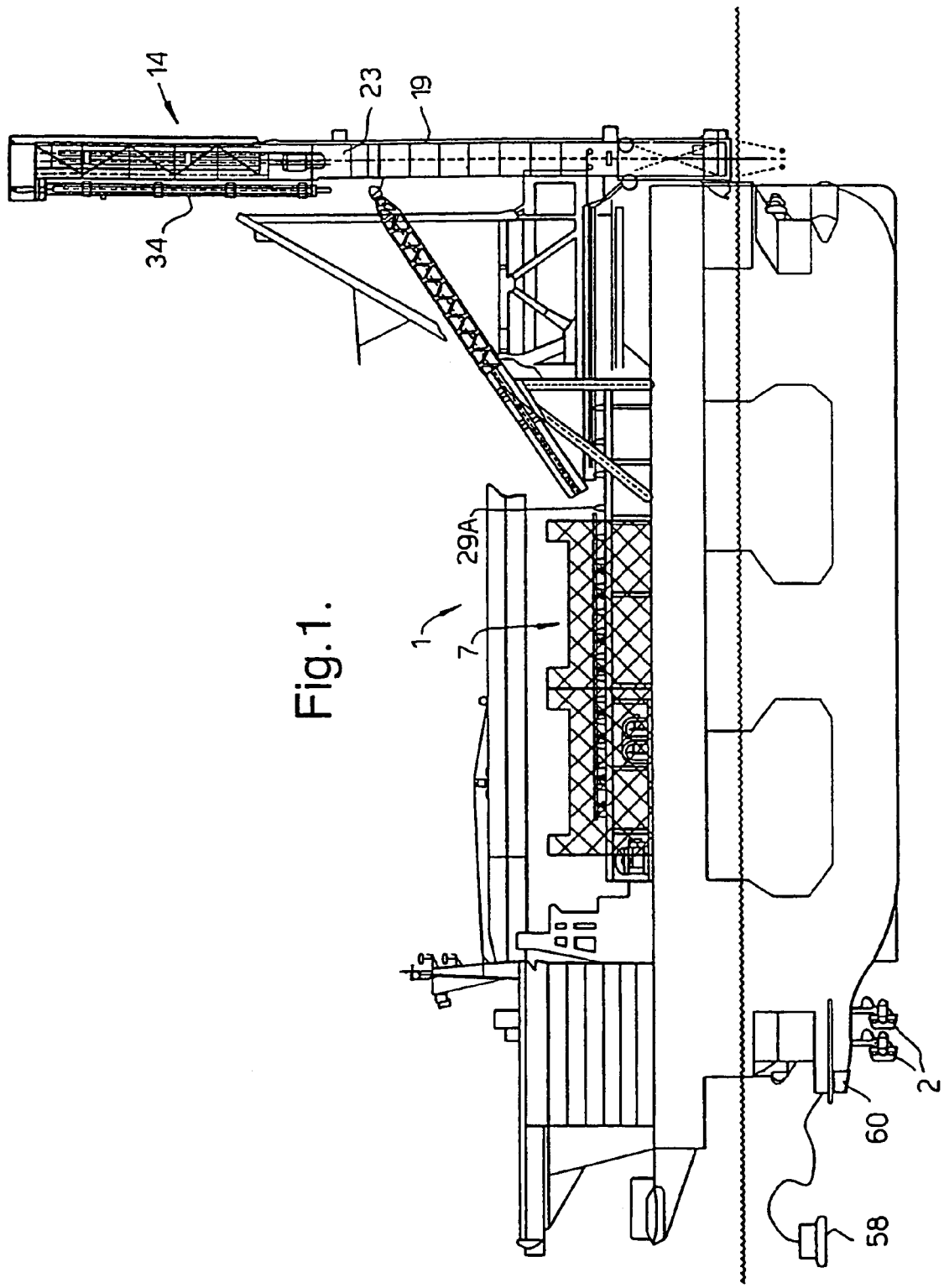
FIG. 1 is a sectional side elevation view of a pipe-laying vessel.
Figure 2:
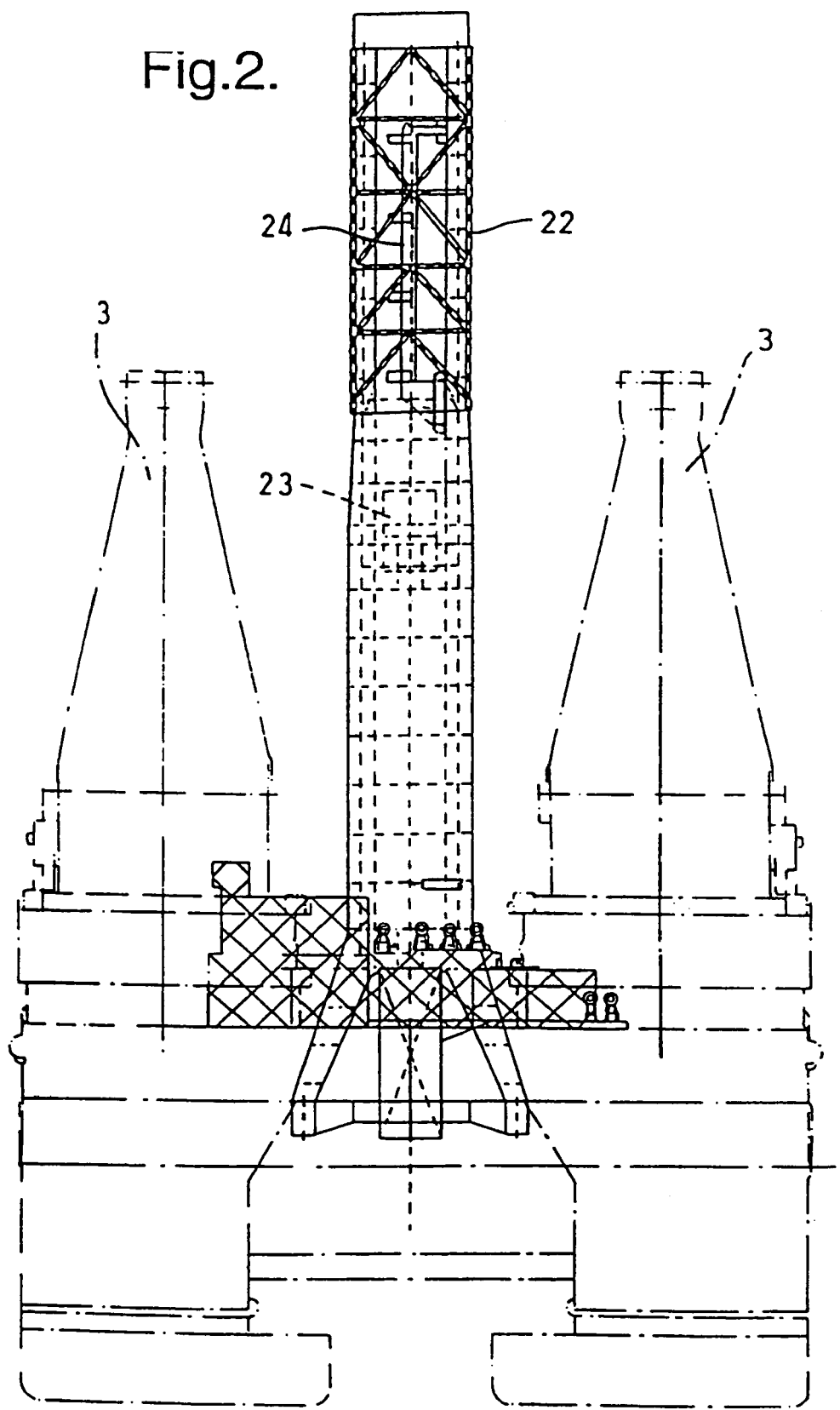
FIG. 2 is a front elevation view of the vessel.
Figure 3:
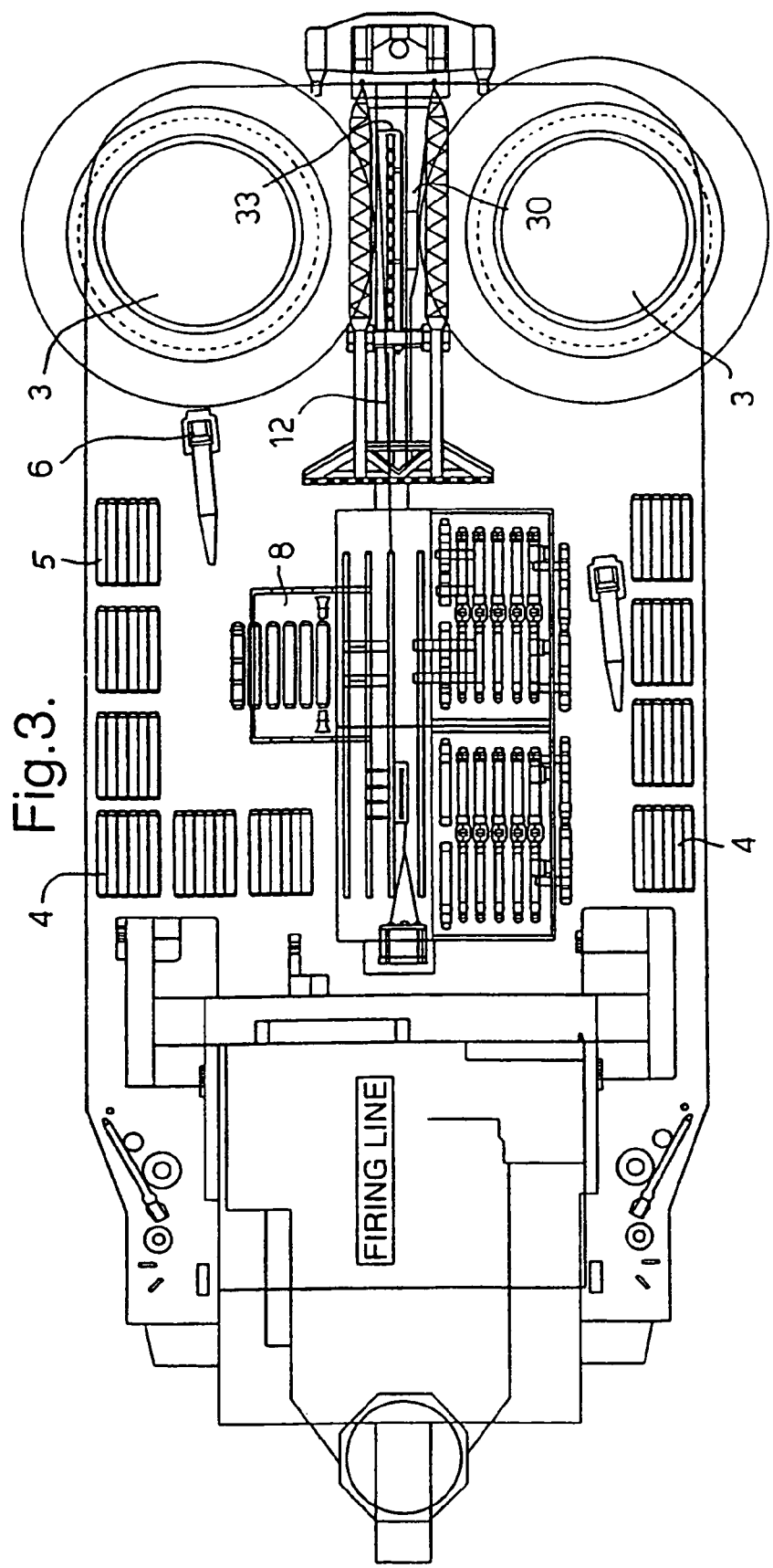
FIG. 3 is a top plan view of the vessel, partly in section.

Referring to the drawings, and initially to FIGS. 1 to 3, one pipe-laying vessel, indicated generally by the reference numeral 1, is a semi-submersible vessel arranged to be propelled and manoeuvred by propeller thrusters 2. The vessel is equipped with two large rotatable cranes 3, mounted one on each side of the bow, which may be of conventional design and, in the interests of simplicity, will not be further described or shown in detail.

The cranes 3 carry on board containers 4 of pipes, which are brought by cargo barges or the like (not shown) and stow them on the deck on both sides of the ship bulkheads.

Figure 4:
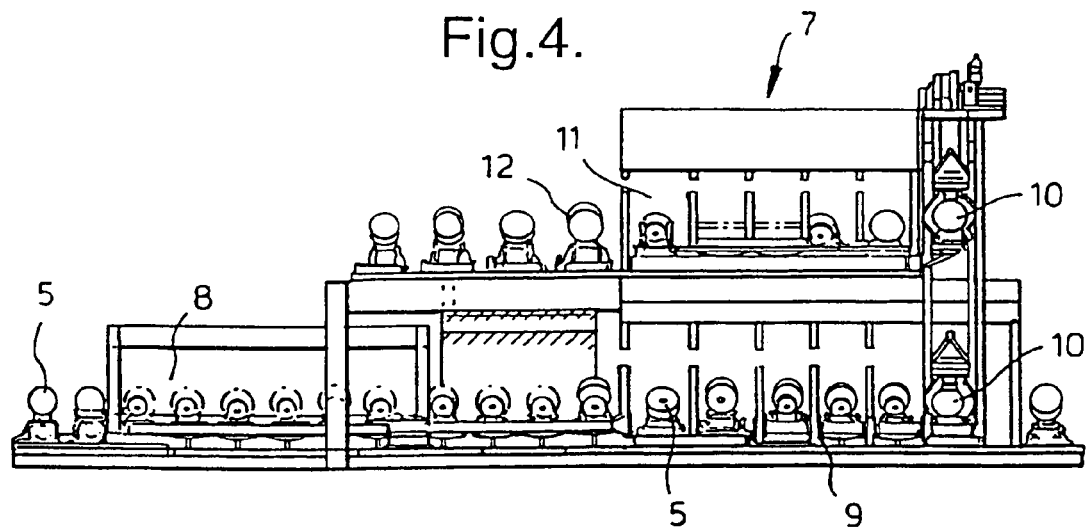
FIG. 4 is a section through a pipe preparation area of the vessel, to a larger scale than FIG. 1.

Pipes 5 are then delivered by crawler cranes 6 and conveyors (not shown) to a double-quadruple joint area, which is accommodated within a module 7 fixed to the deck of the vessel 1 (see FIGS. 3 and 4). The quadruple joint module 7 is placed on the starboard side of the firing line.

The crawler cranes 6 first move the pipes 5 from the stackers, which may be storage stacks on the vessel or may be containers in which the pipes are loaded onto the vessel, to a bevelling station module 8 that is positioned on the port side of the ship, just aside the centre line. After the ends of the pipes 5 have been bevelled, transverse conveyors transfer the pipes to a double joint area 9 of the quadruple joint module 7, where the single joints are welded together. The transverse conveyors may consist of cradles movable along rails running across the vessel. The pipes 5 may be supported on the cradles by rollers that allow lengthwise movement of the pipes and can be adjusted to support pipes of different diameters.

The quadruple joint module 7 has two different levels. In the double joint area 9, at the lower level, four pipes 5 at a time, just arrived from the bevelling station, are conveyed to the appropriate positions in the module and then welded together in pairs into double joint strings 10. Welding is carried out by means of four welding stations, and the welds are X-ray checked at a fifth working station. If the weld has been performed correctly, the double joint strings 10 are lifted up to the second level, to the quadruple joint area 11. Otherwise the joint is moved outside the joint module structure 7 in order to be repaired or, if it cannot be repaired, to be cut. At the quadruple joint area 11, two double joint strings 10 are welded together (by means of four welding stations) and then checked in a fifth working station (NDT station) to form a quadruple joint string 12. If the string 12 is satisfactory, it is transferred horizontally to the centre line of the vessel, where there is a conveyor arranged to move it towards the bow. If the NDT detects a bad weld, the pipe string is shifted aside to the port side of the vessel 1 to be repaired or cut. If a cut is necessary, the quadruple joint 12 is split into four single joints 5 and then transferred back to the bevelling station 8, where it is bevelled again before being returned to the welding process.

At the bow of the vessel 1, on the centre line, between the two cranes 3, is a lay tower indicated generally by the reference number 14. The tower 14 is designed to allow simple installation and removal. The tower 14 is coupled to the hull of the vessel by means of two hinges 15 capable of varying the operational lay slope, which is defined by the longitudinal axis of the tower, from 90° to 120° (from the vertical position to 30° outboard). That movement is necessary to lay various pipe sizes in different sea depths (from shallow to deep water). The angle of the tower 14 is determined by a pivoting jacking system, described below.

Figure 5:
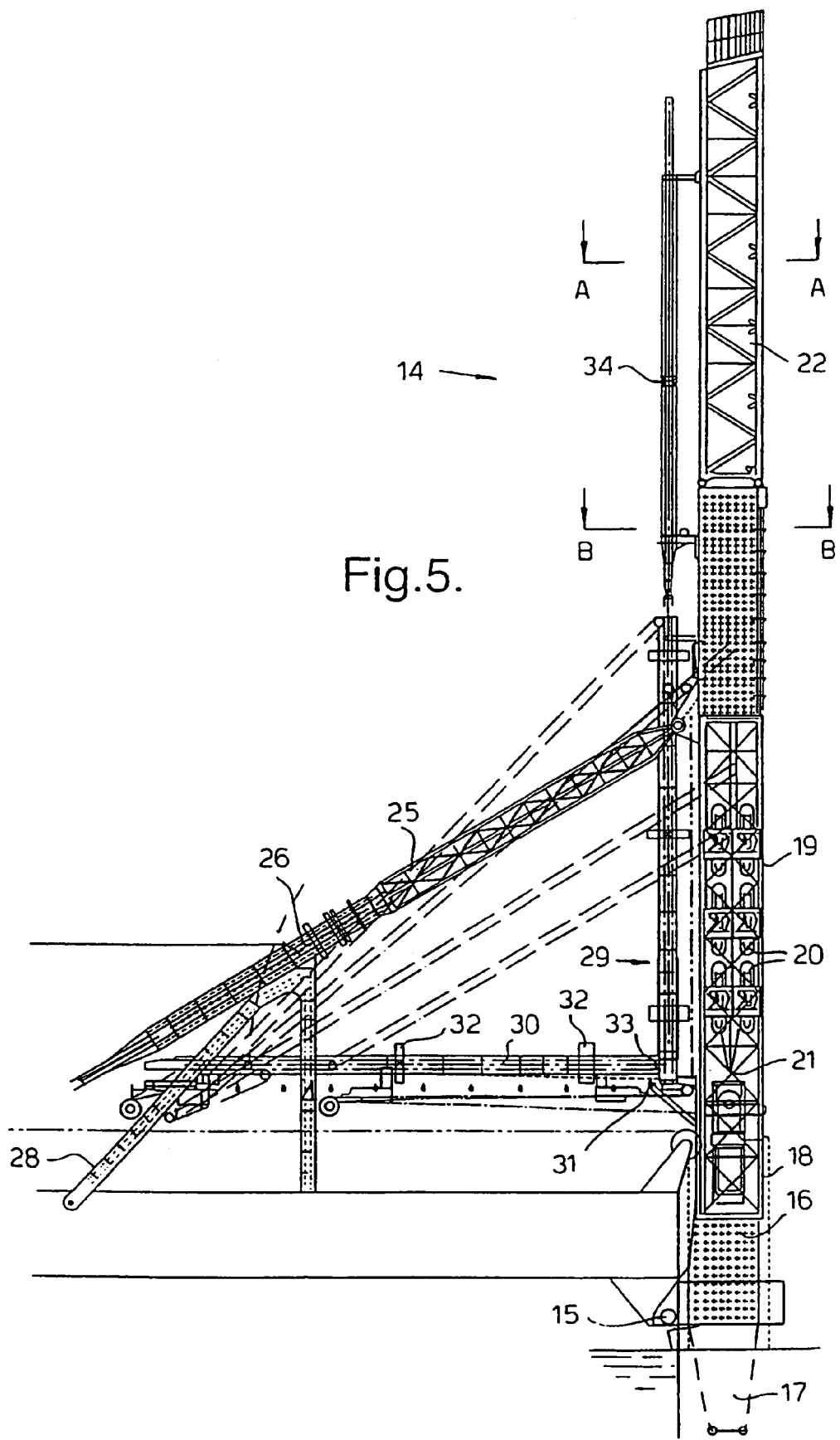
FIG. 5 is a side elevation view of the tower, to a larger scale than FIG. 1.

The tower 14 is essentially constructed in three sections as can be seen in FIG. 5:

The lowest section or basket 16 is designed to support the maximum pulling force on the pipe, received by one or more friction clamps 18. It accommodates the clamps 18 and has at its lower end a lower ramp 17 carrying one or more terminal rollers 41 that guide the pipeline 40 as it leaves the vessel. It is preferably designed so as to be installed and removed by the cranes 3, or by an auxiliary crane vessel, and stored on the deck or on a barge. The friction clamps 18 comprise at least a fixed clamp arranged to hold the sealine 40 securely during interruptions in laying. Preferably, there is also a clamp movable on hydraulic jacks, which can be used when laying objects attached to the pipe that are too large or too irregular to be gripped properly by tensioners.

The middle section 19 accommodates three tensioners 20 which, in operation, lower the pipeline into the water while maintaining it at a desired tension, and pipe support rollers to guide the pipe when the tower 14 is not vertical. The tensioners are crawler-track tensioners of a sort that has been well known for some years in S laying, and the pipe support rollers are also of a type known per se. They are not described in more detail. The middle section 19 also accommodates fold-away sheaves (not shown) for an abandonment and recovery system, when those sheaves are in their idle condition. An NDT and field joint station 21, with floating floor, is located at the lower end of the middle section. A welding station 23, with floating floor, is located at the upper end of the middle section. The distance between the welding stations 21 and 23 corresponds approximately to the length of a quadruple joint string, 12 so that the top of a string can be at the station 23 while the bottom of the same string is at the station 21.

The abandonment and recovery (A/R) system comprises a double capstan winch (electrically driven) with its associated reel winder and with a steel wire rope. The wire rope will be driven to the fold-away sheave (placed on the middle part of the tower) and then connected to the pulling head. The A/R system is accommodated on the main deck in a central position on the centre line of the vessel 1, just beside the quadruple joint module.

The upper section 22 of the tower 14 is a comparatively lightly built structure, because it never needs to support the tension on the pipeline. It accommodates a coupling device, and a line-up station 24 (FIG. 2). The upper section 22 is of open construction, in order to allow simple transferring of the string 12 from a pipe loader, described below, to the line-up station 24. The upper section 22 can be installed onto and removed from the middle section 19 during on-board installation activity.

The jacking system that controls the tilting movement of the tower 14 uses booms 25 that are connected to the upper portion of the middle section 19 of the tower, on its sternward or inboard face, and to jacking devices 26 on a support base frame 28 positioned on the deck just astern of the cranes 3. The jacking system comprises hydraulic cylinders, the pistons of which each carry a set of four hydraulically-actuated locking pins that engage in a row of apertures in the booms 25. When the tower is not being jacked, it is held by similar locking pins that are mounted in fixed positions on the base frame 28. If the tower is to be moved by more than the stroke of the hydraulic cylinders, it is held by the locking pins while the cylinders return for another stroke.

The pipe string 12 that is waiting horizontally at the quadruple joint area 11 is transferred by longitudinal conveyors 29A towards a pipe loader 29 at the base of the tower 14. The longitudinal conveyors may consist of rollers 29A mounted with their axes oblique to the horizontal, so that they define a V-shaped envelope, within which the pipe moves. They are movable towards and away from the centre line, so that pipes of different diameters can be conveyed at a desired height above the deck.

The pipe loader 29 consists mainly of a truss 30 that transfers the pipe 12 from the quadruple joint area 11 to the middle section 19 of the tower 14 by means of its own rotation around a hinge 31. Because it rotates, the loader can easily accommodate the different positions that the pipe must reach when rotated to the several operational laying angles (from 90° up to 120°). The loader truss 30 is designed to be as light as possible in order to reduce the inertia of the system. As may be seen from FIG. 3, the loader truss is on the starboard side of the firing line, and it accommodates clamping units 32 (FIG. 5) that firmly grip the pipe string 12 and hold it alongside the truss 30 during the rotation. The pipe string 12 is supplied horizontally by the roller conveyors 29A from the quadruple joint area 11 to the loader area, and is then, if necessary, immediately raised by pipe lifters (not shown in detail) to a position where it can be engaged by the clamping units 32 on the pipe loader 29. At the proximal end of the loader 29, a mechanical safety stopper 33 is installed to prevent the pipe from falling if there is a hydraulic failure of the clamps 32. In normal use, the pipe does not rest on the stopper 33, in order to avoid the risk of damage to the machined bevel at the end of the pipe.

The rotation of the pipe loader 29 is effected by means of two winches (not shown), both of them mounted in the A-frame 28. A hoisting winch, with a rope passing over a sheave on the tower, raises and lowers the pipe loader 29, while a back tension winch applies a constant tension in the opposite direction, in order to prevent uncontrolled movement of the pipe loader when it rotates beyond the vertical position or as a result of the movement of the vessel. The winch speed is defined in order to perform the loading activity within the cycle time of the laying operation.

The function of the loader 29 is only to grab the pipe 12 (by means of the clamps 32) and rotate it to the same angle of tilt as the tower 14. As soon as the pipe 12 is lying along the tower 14, the loader 29 stops its movement and waits (holding the pipe) for the lowering of an elevator 34.

The elevator 34 takes the pipe string 12 from the loader 29 and transfers it to the level of the line-up station 24. The elevator 34 consists mainly of a trolley running in two railway tracks 35, positioned on the middle part 19 and the upper part 22 of the tower, on the port side of the centre line of the loader 29. The trolley carries openable clamps 37. As may be best seen from FIG. 6, when the clamps 37 are fully open they are withdrawn to the port side of the firing line, so that the loader 29 can raise the pipe string 12 alongside the elevator 34. When small pipes are being handled, guiding rollers may also be fitted. At the lower end of the elevator 34 is installed a safety stop to support the pipe string if there is any failure of the hydraulic clamps 37. When the loader 29 arrives at the tower 14 and the elevator 34 is in its lower position, the clamps 37 grab the pipe 12, and the clamps 32 release it. The elevator 34 then lifts the pipe to the upper position. Then, the pipe 12 is transferred to transfer clamps 38.

Figure 6:
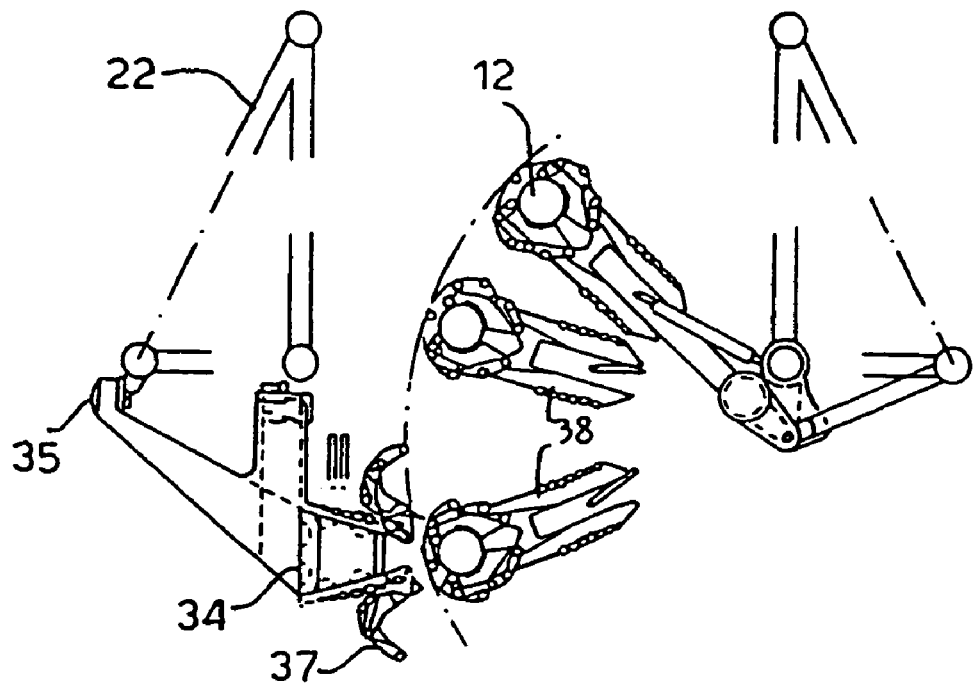
FIG. 6 is a cross-section through the tower, along the line A—A in FIG. 5.
Figure 7:
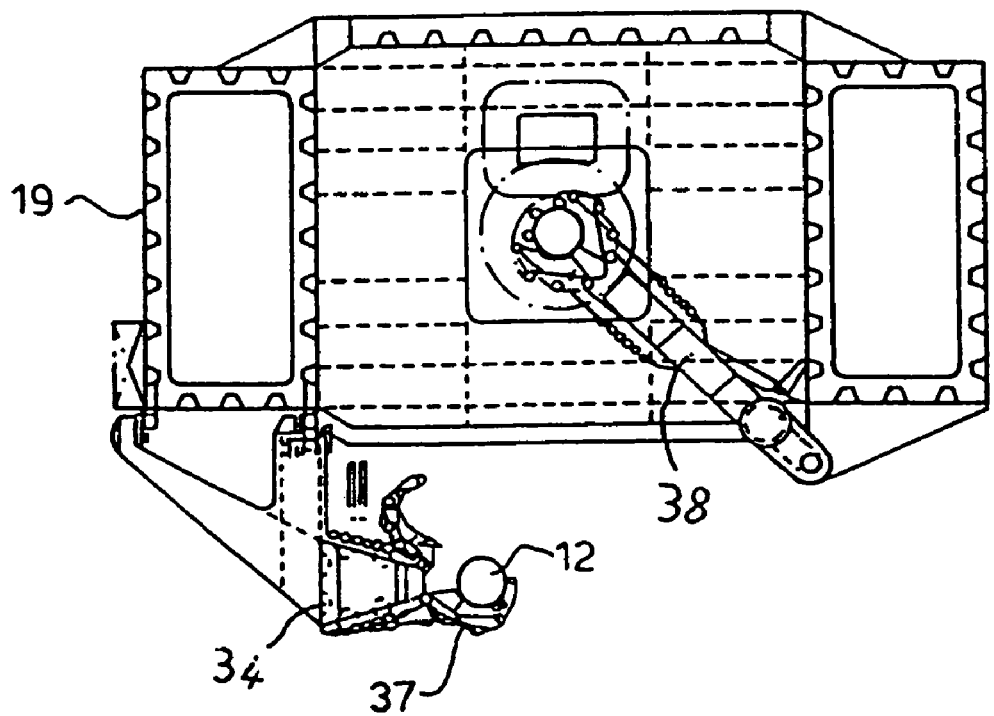
FIG. 7 is a cross-section through the tower, along the line B—B in FIG. 5.

Three vertically spaced transfer clamps 38 are provided, to transfer the pipe string 12 from the elevator 34 to the line-up machine 24: FIG. 6 shows one of the transfer clamps in three different positions; the clamps are arranged as independent units, each comprising a rotatable and extensible arm controlled by transducers, on which is installed a fully opening clamp. When the clamps are in the external position the elevator transfers the pipe to them, while when they are in the inner position the line-up machines 24 move transversely and take the pipe from them. If a pipe string 12 is delivered by the elevator 34 before the line-up machines 24 are free to receive it, the transfer clamps 38 can hold the pipe string in a standby position, as shown in FIG. 6. In addition, an umbilical may be inserted into the pipe string 12, and/or the lower end may be pre-heated for welding, while the pipe string is held in the standby position.

The line-up machines 24 are necessary for the correct alignment between the pipe string 12 and the sealine 40. They are capable of moving the pipe in all three dimensions. They consist of a mixture of roller clamps, which fix the horizontal position of the pipe string 12 but allow it to rotate, and at least one rotatable friction clamp by means of which the orientation of the pipe about its own axis can be adjusted. Each machine is structurally independent from the others, but they must be controlled by means of transducers in order to ensure the correct alignment of the machines during the alignment of the pipe. Between the line-up machines 34, guiding rollers are installed in order to ensure that the pipe 12 is adequately supported during laying, when the line-up clamps are open, even with the tower 14 in a tilted position.

Figure 9:
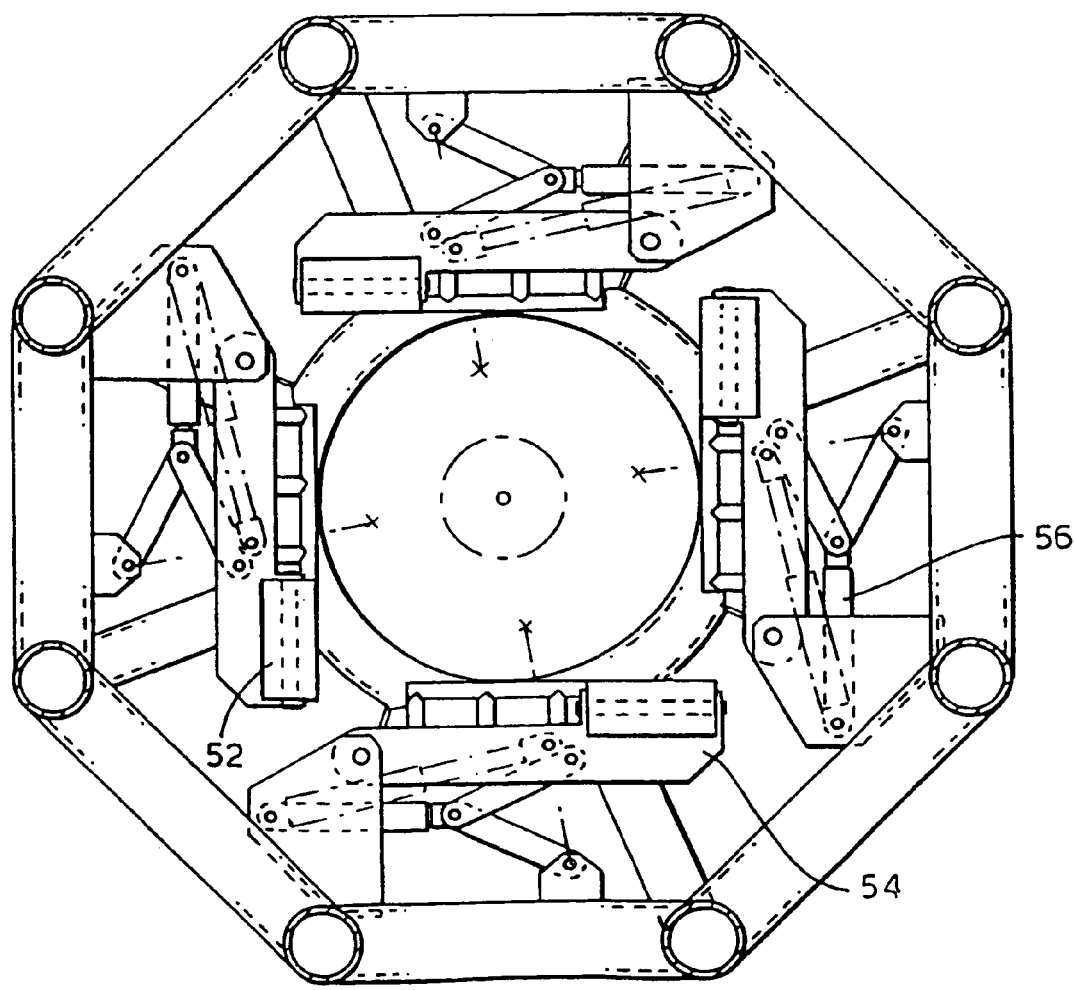
FIG. 9 is a cross-section along the line C—C in FIG. 8.
Figure 8:
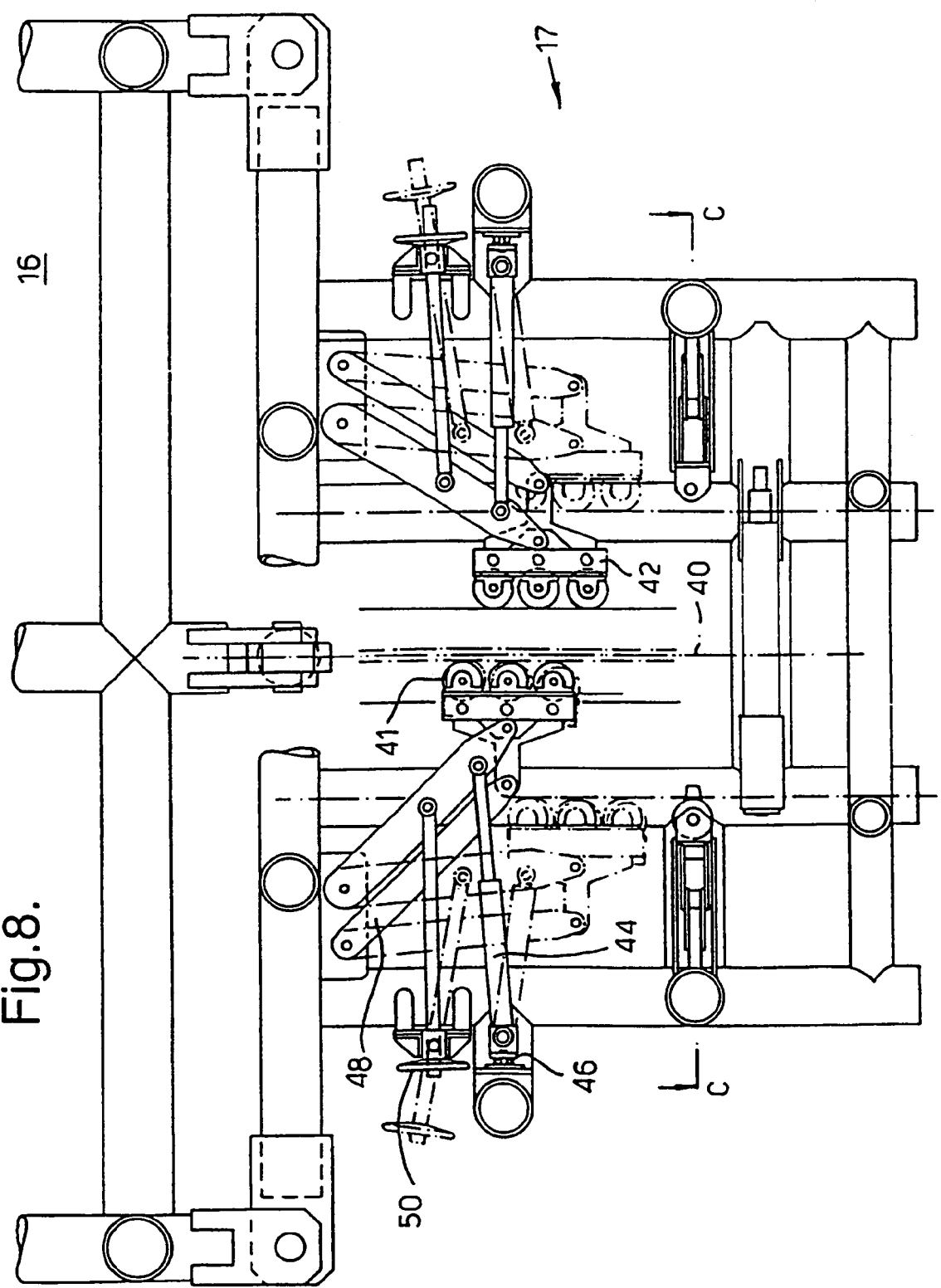
FIG. 8 is a longitudinal section through part of a lower ramp portion of the tower.
Figure 10:
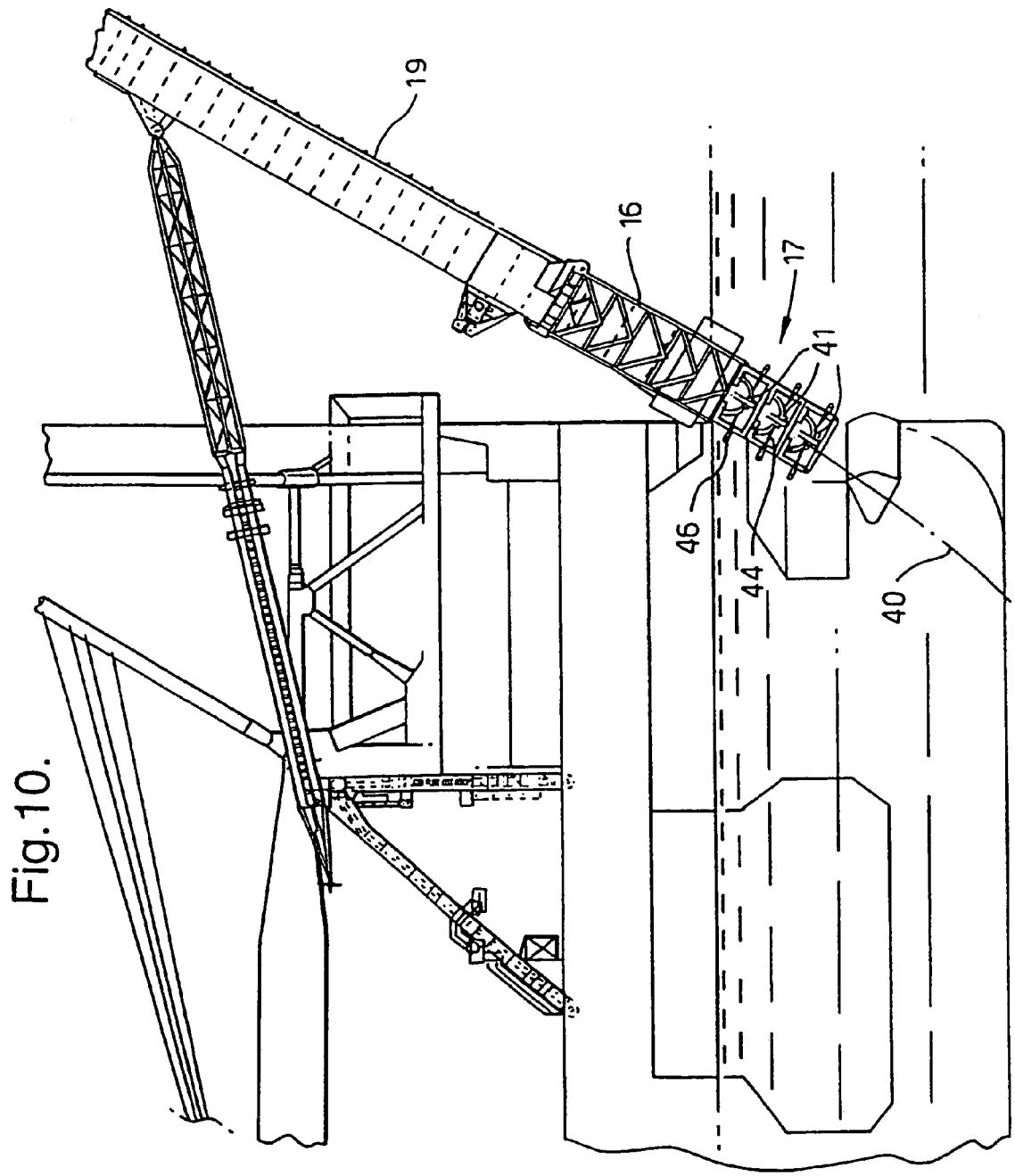
FIG. 10 is a side elevation view of part of the vessel.
Figure 13:
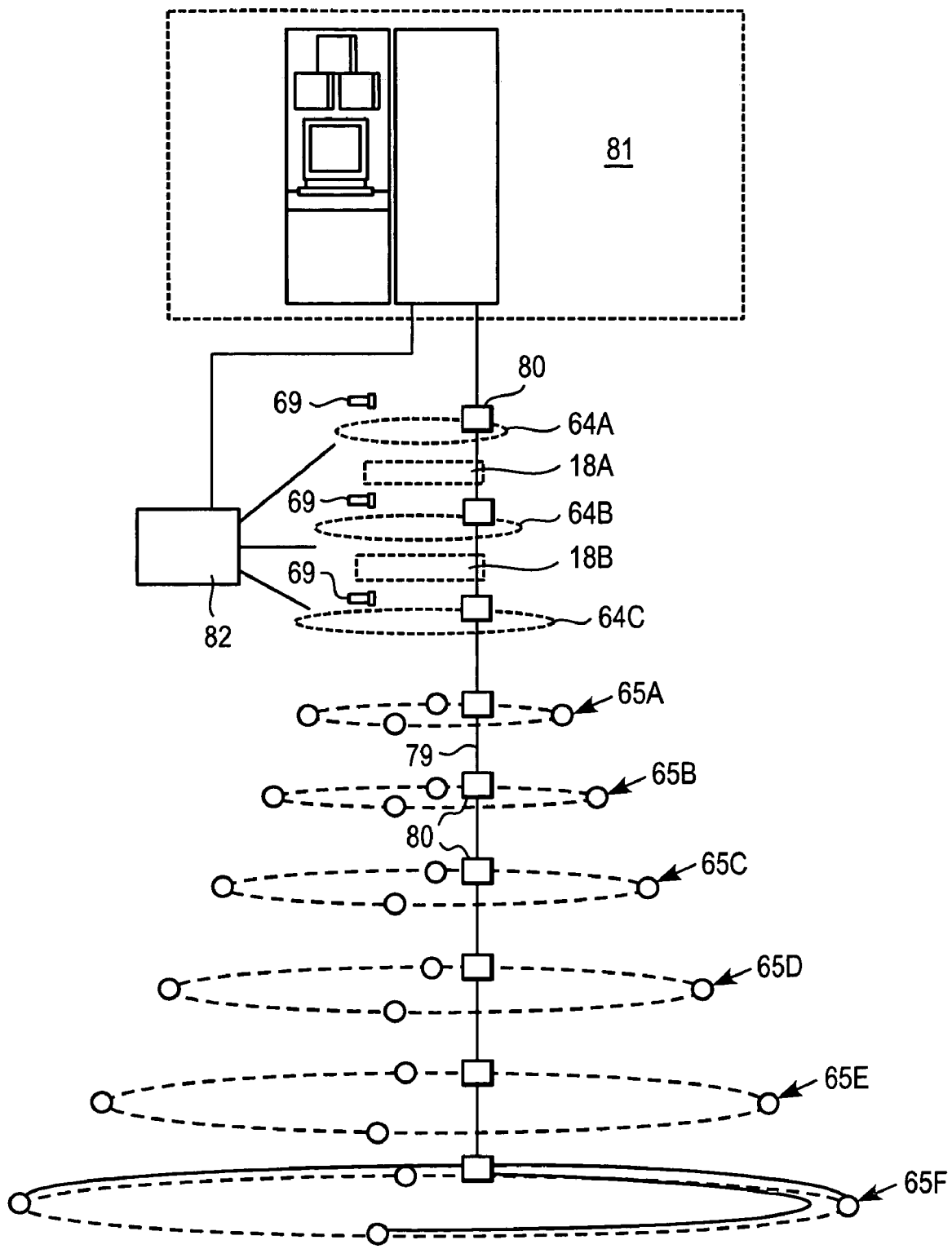
FIG. 13 is a diagrammatic side view of the lower portion of the tower shown in FIG. 11 indicating the spatial arrangement of guide rollers in the modified lower guide arrangement.
Figure 14:
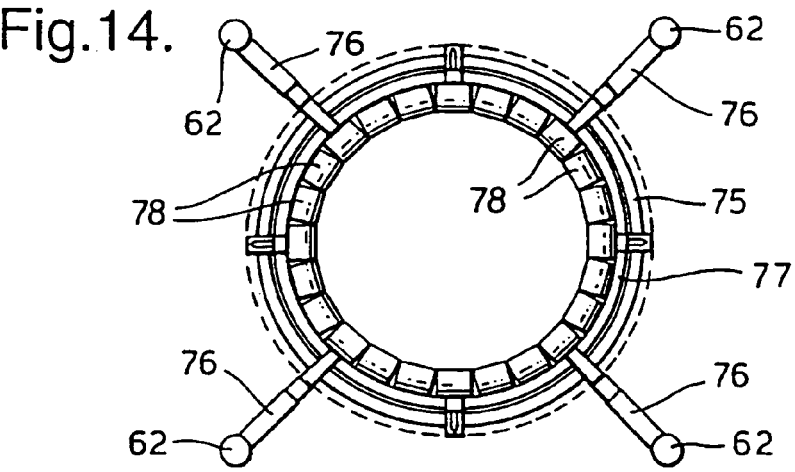
FIG. 14 is a sectional plan view through a lower region of the modified lower guide arrangement.

Referring now to FIGS. 8, 9, and 10, the lower ramp 17 carries the terminal rollers 41 in sets of 3 on bogies 42. During pipe-laying, each bogie 42 is urged into engagement with the sealine 40 by a hydraulic cylinder 44, pressurised by an accumulator (not shown), while the load on the bogie 42 is monitored by a load cell 46. The movement of each bogie is controlled by a parallel linkage 48, while the fully retracted position can be set by means of screw-jacks 50. The terminal rollers 41 thus make it possible both to monitor and to control the alignment of the sea line 40 as it leaves the vessel. If greater control is required, several sets of bogies 42 may be mounted, one above another, as shown in FIG. 10, enabling a controlled deflection of the sealine, so that it can be laid at a slight angle to the axis of the tower 14, thus increasing the versatility of the vessel.

Below the terminal rollers 41 there are provided wire-guiding rollers 52. The rollers 52 are mounted on pivot arms 54, and are moved in and out by hydraulic cylinders 56. They are kept fully retracted during pipe-laying, but are advanced to guide the wire rope during the abandonment and recovery procedures.

A remotely operated vehicle 58 is carried on the vessel 1, for monitoring the touch-down of the sealine 40 on the seabed. Because the point of touch-down is directly below, or close to directly below, the stern of the vessel, the ROV may be operated from the stern deck of the vessel 1 without needing an inconveniently long tether. Instead, or in addition, the touch-down may be monitored directly by active or passive sensors 60 mounted on the rear of the vessel.

In operation, the pipe 12 is aligned by the line-up machines 24 and held by them while its lower end is welded to the upper end of the sealine 40 in the welding station 23. Then, the line-up machines are released, the vessel is moved forwards, the sealine is fed out by the tensioners 20 by the length of a quadruple joint 12. Then, the join that has just been welded is tested in the NDT station 21, while a new joint 12, which has in the meantime been delivered by the loader 29 and the elevator 34, is fed by the transfer clamps to the line-up machines 24.

The tower 14 is constructed in three sections and is attached to the vessel, and the quadruple joint module 7 is constructed as one or more largely self-contained modules attached to the deck, in such a way that the entire pipe-laying equipment can be assembled or disassembled easily and quickly, allowing conversion of the vessel as a whole from use as a pipe-laying vessel to use as an ordinary semi-submersible crane vessel.

As an example, a vessel such as that shown in the drawings may have the following dimensions:

| | |
|---|---|
| Length of vessel | 200 meters |
| Height of tower | 135 m |
| Pipe Diameter Range (O.D.) | from 4" to 32" |
| Max. diameter of objects to be laid with tensioners open | 2.5 m |
| Lay depth range for 4" pipe | 50 m to 3000 m |
| Lay depth range for 32" pipe | 200 m to 2000 m |
| Maximum lay holding force (tensioners) | 525 metric ton |
| Maximum lay holding force (movable clamp) | 2000 metric ton |
| Lay tower angle | 90°–120° |
| Intermediate pull A/R winch (double capstan) | up to 550 metric ton (max.) |
| High pull A/R winch (linear winch) | 2000 metric ton (max.) |
| Length of joint carry on board | 12.2 m |
| Pipe string length (4 × 10 to 15 m) | 48.8 m |
| Lay phase time | 2 min. |
| Maximum operational wave height (significant) | 4 m |

FIGS. 11 to 17C show a modified form of lower guide arrangement 61 which can be used in place of the lower ramp 17 and results in a vessel embodying the invention. In FIGS. 11 to 17C parts corresponding to parts shown in other drawings are designated by the same reference numerals. As shown in FIGS. 11 and 12, the arrangement 61 generally comprises a tubular frame including four longitudinal members 62 and cross-bracing members 63 joined together to form a substantially rigid structure that is fixed to the bottom of the tower 14 by four legs (one at the top end of each of the members 62). The lugs are secured to the tower by respective pin connections.

Referring now also to FIGS. 13 to 17C, the structure formed by the members 62 and 63 serves to support various assemblies at different levels, including fixed and mobile clamps 18A and 18B respectively (FIG. 13), three sets of adjustable rollers 64A, 64B and 64C and six sets of guide rollers 65A to 65F, each set comprising a ring of rollers as will be described more fully below.

The adjustable rollers 64A, 64B and 64C serve a purpose similar to that of the rollers 52 described with reference to FIGS. 8, 9 and 10. The rollers 64A, 64B, 64C are mounted for radial movement and moved by respective hydraulic piston and cylinder arrangements. In the particular example of the invention described the sets of rollers 64A and 64B are each arranged as shown in plan view in FIG. 17A and comprise 4 rollers 66 equiangularly spaced around the pipeline path and the rollers of the set of rollers 64C are each arranged as shown in plan view in FIG. 17B and comprise eight equiangularly spaced rollers 67. One purpose of the rollers 64A, 64B, 64C is to keep the pipeline (sealine) 40 within a central circular region of an adjustable radius so that the clamps 18A and 18B, which are operated only in special situations such as an emergency, are assured of gripping the pipeline. A further purpose of the rollers, however, and especially the rollers 64B and 64C is to allow some initial, controlled, bending of the pipeline even at their relatively high levels above sea level. Television cameras 69 (FIG. 13) and load sensors associated with the rotational mountings of the rollers can monitor the passage of the pipeline through the rollers and the extensions of the hydraulic piston and cylinder arrangements and the hydraulic pressures therein can also be monitored and adjusted.

Figure 17A:
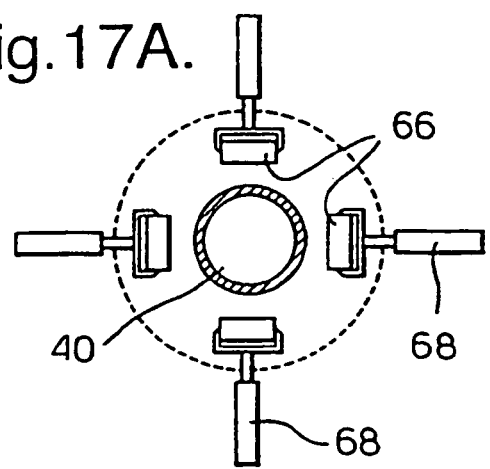
FIG. 17A is a sectional plan view through an uppermost region of the modified lower guide arrangement.
Figure 17B:
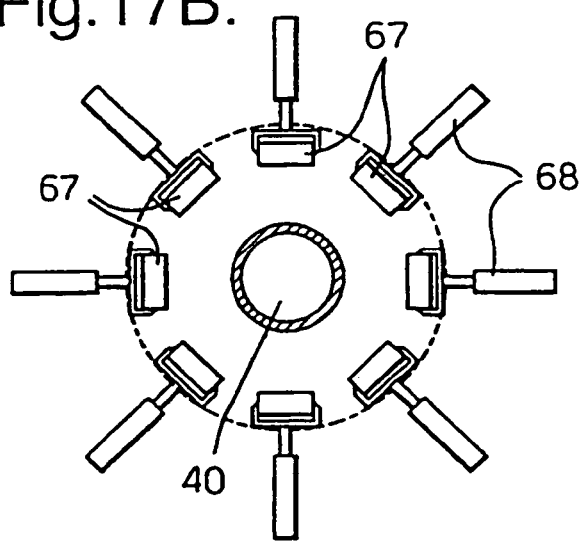
FIG. 17B is a sectional plan view through an upper region of the modified lower guide arrangement.
Figure 17C:
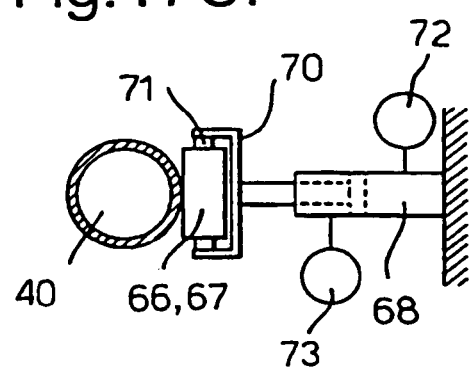
FIG. 17C is a plan view to a larger scale of a roller arrangement of the kind shown in FIGS. 17A and 17B.

In FIG. 17C one of the hydraulic piston and cylinder arrangements is shown by way of example. It will be seen that the roller 66 or 67 is rotatably mounted on a support 70 and a load pin 71 provides a measurement of the force exerted by the pipeline 40 on the roller 66, 67. The support is connected to the piston of one of the piston and cylinder arrangements 68 which includes a pressure transducer 72 for monitoring pressure in the cylinder and a position transducer 73 for monitoring the position of the piston relative to the cylinder.

Signals from the television cameras 69 and the transducers 72, 73 and load pins 71 are all passed back through a multicore cable 79 having junction boxes 80 to a control station 81 which may be provided in a tower control room. Control signals for the operation of the piston and cylinder arrangements 68 are passed down from the control station 81 to a hydraulic supply and control valve station 82.

The arrangement of the six sets of guide-rollers 65A to 65F will now be described in more detail with reference to FIGS. 13, 14, 15, 16A and 16B. For convenience the arrangement of the set of rollers 65D will first be described, that being the set of rollers shown in FIG. 14. A steel ring 75 provides the main fixed structural support for the set of rollers and is of a diameter suited to the particular set of rollers 65D so as to extend circumferentially around them. The ring 75 is fixed to the four longitudinal members 62 of the lower guide arrangement via struts 76. Immediately inside the ring 75 is another ring-shaped member 77 on which the rollers 78 are rotatably mounted. The ring-shaped member 77 is connected to the ring 75 at four equiangularly spaced positions around the roller structure via resilient mountings 83 shown in FIGS. 16A and 16B.

Figure 15:
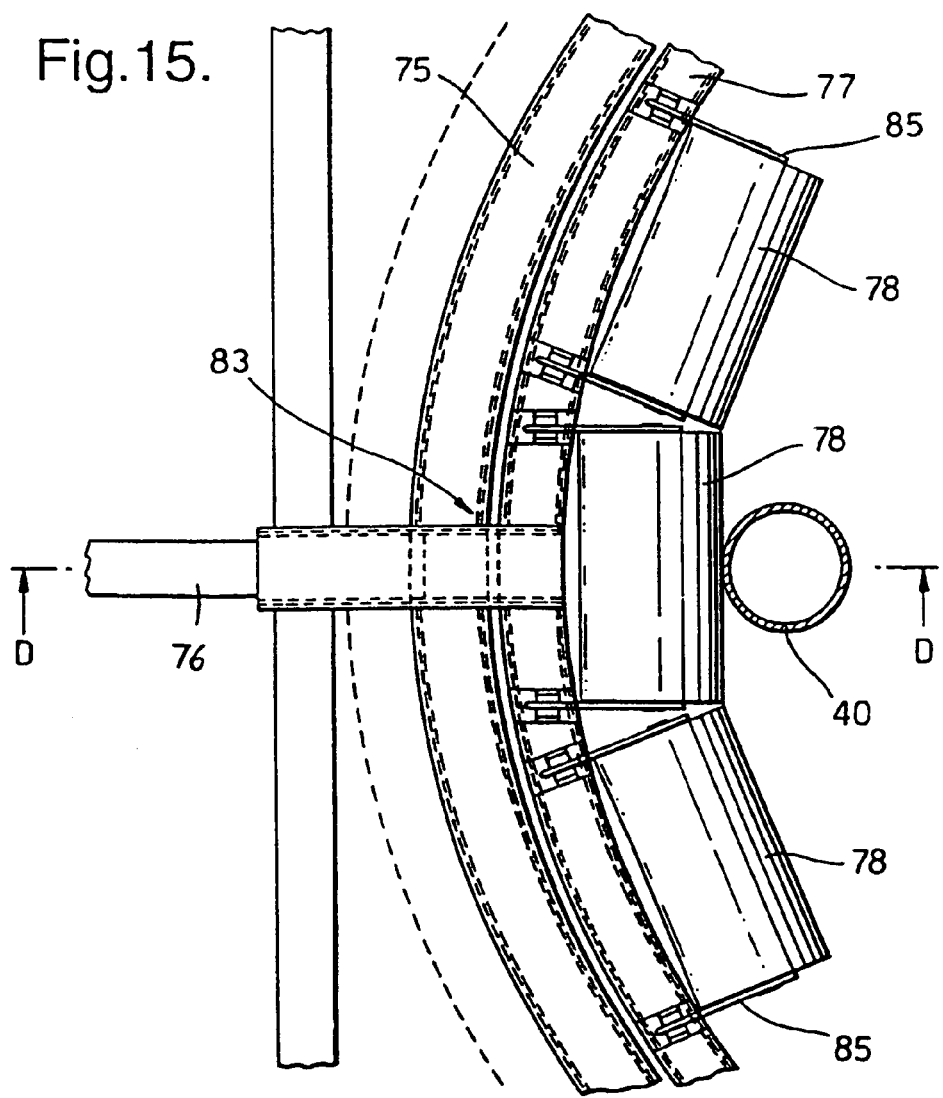
FIG. 15 is a sectional plan view to a larger scale than FIG. 14 through part of the same lower region of the modified lower guide arrangement.
Figure 16A:
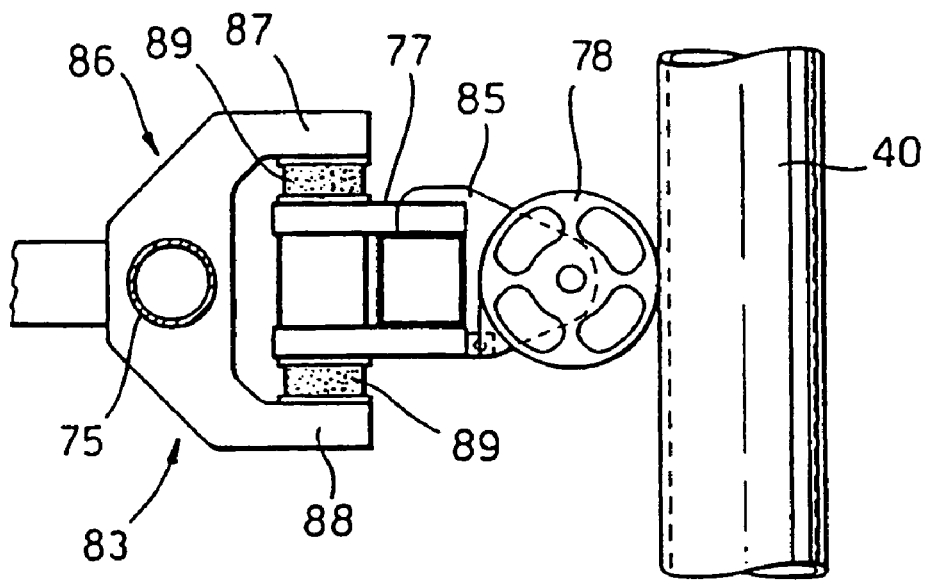
FIG. 16A is a sectional view along the line D—D in FIG. 15 of a guiding part of the modified lower guide arrangement with the guiding part in an unstressed condition.
Figure 16B:
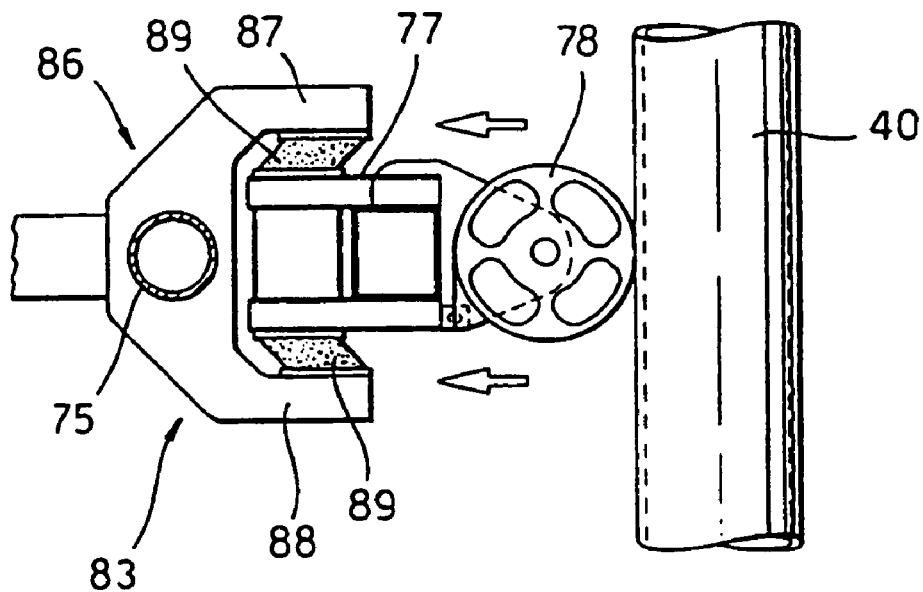
FIG. 16B is a sectional view along the line D—D in FIG. 15 of a guiding part of the modified lower guide arrangement with the guiding part in a stressed condition.

Referring in particular to FIGS. 15, 16A and 16B, each of the rollers 78 is rotatably mounted at each end on bracket arms 85 which are fixed to the ring-shaped member 77 and project radially inwardly therefrom. The ring 75 has supports 86 welded to it at the four locations of the resilient mountings 83 and each support 86 has an upper arm 87 and a lower arm 88 which projects radially inwardly over the ring-shaped member 77. The arms 87, 88 are each joined to the member 77 by a respective block 89 of elastomeric material. FIG. 16A shows the blocks 89 in their unstressed state, whilst FIG. 16B shows the blocks 89 in a stressed state following radially outward movement of a roller 78 (and therefore corresponding movement of the member 77) as a result of the force exerted by the pipeline 40. It can be seen from FIG. 16B that the blocks 89 undergo shear strain to accommodate the movement.

Load cells (not shown) are associated with each of the sets of guide rollers 65A to 65F and signals from the load cells are passed back to the control station 81 via the junction boxes 80 and the cable 79. Signals from the load cells can be used by a controller to alter the pipe laying operation or adjust the direction or speed of travel of the vessel or the like.

Operation of the guide rollers during laying of a pipeline will now be described. In order to simplify the description, it will be assumed that the tower is oriented vertically, but it should be understood that the guide arrangement operates in substantially the same way when the tower is inclined. Also, for ease of description; it will in the first place be assumed that the vessel is travelling directly above the path on which the pipeline is being laid and is aligned with the path.

In order that the curvature of the pipeline in the region of the seabed should not be excessive, it is important that during laying of the pipeline a horizontal force is applied to the pipeline by the vessel in the direction in which the pipe is being laid and that a tensioning force is also applied. At the same time the force must be applied in a way that does not cause undue local stress in the pipeline.

Consequently, it is desirable that each of the sets of rollers 65A to 65F apply a horizontal force to the pipeline and, desirably, each set of rollers applies substantially the same force. That is achieved in the embodiment of the invention by arranging the sets of rollers so that they are positioned along a curved path allowing a degree of controlled bending of the pipeline as it passes through the sets of rollers. The resilient mounting of the rollers further assists in promoting an even application of loads amongst the various sets of rollers.

An especially valuable feature of the design of the guide arrangement is that each set of guide rollers completely surrounds the pipeline. That is important in allowing the vessel to be at any angle to the path of the pipeline as may be desirable or essential when laying a pipeline in a significant current.

In a particular example of the invention, that may be employed in the case of the particular example of vessel described above, the sets of guide rollers 65A to 65F are spaced apart along the cable path at intervals of 5.2 m with the top set of rollers 65A above sea level and all the other sets below sea level. In that case the spacing between the circumferences of diametrically opposed rollers in each set is as follows:

| Roller Set | Spacing (m) |
| --- | --- |
| 65A | 2.44 |
| 65B | 3.54 |
| 65C | 5.0 |
| 65D | 6.79 |
| 65E | 8.96 |
| 65F | 11.48 |

The mountings of the sets of rollers 65A to 65C are relatively stiff and they provide the rings 77 of the sets with a radial stiffness of about 5,000 kN/m with (with a maximum displacement of 100 mm), whilst the mountings of the sets of rollers 65D to 65F are less stiff and provide the rings 77 of those sets with a radial stiffness of about 1000 kN/m (with a maximum displacement of 300 mm). The total load typically applied to the pipeline by all six sets of rollers is of the order of 1000 kN during normal operation, resulting in a force of about 170 kN between each roller and the pipeline.

The invention claimed is:

1. A method of J-laying a pipeline from a vessel, comprising:
  lowering the pipeline down an upwardly extending tower assembly of the vessel and then through a lower guide arrangement, the lower guide arrangement including a plurality of sets of guide rollers spaced apart along the path of the pipeline and defining the lateral limits of the pipeline, the pipeline undergoing some bending so that the pipeline is less vertical as the pipeline passes through the lower guide arrangement than when the pipeline passes through the tower assembly upstream of the lower guide arrangement; and
  monitoring forces applied to the pipeline by rollers of the lower guide arrangement;
  wherein each of the sets of guide rollers defines a respective set diameter and the set diameters increase non-linearly in the direction of travel of the pipeline during laying.

2. A method according to claim 1, employing a pipe-laying vessel comprising:
  an upwardly extending tower assembly defining a path down which a pipe of a pipeline passes as the pipeline is being laid by the vessel; and
  a lower guide arrangement for guiding the pipeline after it has passed down the tower, the lower guide arrangement including a plurality of sets of guide rollers spaced apart along the path of the pipeline and defining the lateral limits of the path, the guide rollers being located such that they allow some bending of the pipeline as it passes through the lower guide arrangement.

3. A method according to claim 2, in which the operation of the vessel is adjusted in dependence upon the monitoring.

4. A method according to claim 2, in which the direction or speed of travel of the vessel is adjusted in dependence upon the monitoring.

5. A method according to claim 1, further comprising monitoring forces exerted on the pipeline by one or more of the guide rollers and adjusting the operation of the vessel in dependence upon the monitoring.

6. A method according to claim 2, further comprising monitoring forces exerted on the pipeline by one or more of the guide rollers and adjusting the operation of the vessel in dependence upon the monitoring.

7. A method according to claim 1, in which the force is monitored with load cells.

8. A method according to claim 7, wherein signals from the load cells are received by a control station.

9. A method according to claim 8, in which the control station provides signals for the operation of piston and cylinder arrangements for operating the guide rollers.

10. A method according to claim 9, in which the signals provided by the control station are passed to a hydraulic supply and control valve station.

11. A method according to claim 1, in which the operation of the vessel is adjusted in dependence upon the monitoring.

12. A method according to claim 1, in which the direction or speed of travel of the vessel is adjusted in dependence upon the monitoring.

13. A method according to claim 1, in which the pipe laying operation is adjusted in dependence upon the monitoring.

14. A method of J-laying a pipeline from a vessel, comprising:
  lowering the pipeline down an upwardly extending tower assembly of the vessel and then through a lower guide arrangement, the lower guide arrangement including a plurality of sets of guide rollers spaced apart along the path of the pipeline and defining the lateral limits of the pipeline, the pipeline undergoing some bending so that the pipeline is less vertical as the pipeline passes through the lower guide arrangement than when the pipeline passes through the tower assembly upstream of the lower guide arrangement; and
  monitoring forces applied to the pipeline by rollers of the lower guide arrangement at each set of rollers of the lower guide arrangement;
  wherein each of the sets of guide rollers defines a respective set diameter and the set diameters increase non-linearly in the direction of travel of the pipeline during laying.

15. A method of J-laying a pipeline from a vessel, comprising:
  lowering the pipeline down an upwardly extending tower assembly of the vessel and then through a lower guide arrangement, the lower guide arrangement including a plurality of sets of guide rollers spaced apart along the path of the pipeline and defining the lateral limits of the pipeline, each set of guide rollers being arranged to substantially surround the pipeline, the pipeline undergoing some bending so that the pipeline is less vertical as the pipeline passes through the lower guide arrangement than when the pipeline passes through the tower assembly upstream of the lower guide arrangement; and
  monitoring forces applied to the pipeline by rollers of the lower guide arrangement at each set of rollers of the lower guide arrangement;
  wherein each of the sets of guide rollers defines a respective set diameter and the set diameters increase non-linearly in the direction of travel of the pipeline during laying.

16. A pipe-laying vessel for J-laying a pipe, the vessel comprising:
  an upwardly extending tower assembly defining a path down which a pipe of a pipeline passes as the pipeline is being laid in a J-laying process by the vessel; and
  a lower guide arrangement for guiding the pipeline after it has passed down the tower, the lower guide arrangement being substantially trumpet shape, flaring outwardly in the direction of travel of the pipeline during laying, and the lower guide arrangement including a plurality of sets of guide rollers spaced apart along the path of the pipeline and defining the lateral limits of the path, and each of the sets of guide rollers defines a respective set diameter and the set diameters increase nonlinearly in the direction of travel of the pipeline during laying the guide rollers being located such that they allow some bending of the pipeline so that the pipeline as the pipeline passes through the lower guide arrangement than when the pipeline passes through the tower assembly upstream of the lower guide arrangement; and means for monitoring forces applied to the pipeline by rollers of the lower guide arrangement.

17. A method of J-laying a pipeline from a vessel, comprising:

lowering the pipeline down an upwardly extending tower assembly of the vessel and then through a lower guide arrangement, the lower guide arrangement being substantially trumpet shape, flaring outwardly in the direction of travel of the pipeline during laying, the angle of flare increasing in the direction of travel of the pipeline during laying, and including a plurality of sets of guide rollers spaced apart along the path of the pipeline and defining the lateral limits of the pipeline, the pipeline undergoing some bending so that the pipeline is less vertical as the pipeline passes through the lower guide arrangement than when the pipeline passes through the tower assembly upstream of the lower guide arrangement;

monitoring forces applied to the pipeline by rollers of the lower guide arrangement; and providing signals for operation of piston and cylinder arrangements for operating the guide rollers;

wherein each of the sets of guide rollers defines a respective set diameter and the set diameters increase nonlinearly in the direction of travel of the pipeline during laying.

18. A pipe-laying vessel for J-laying a pipe, the vessel comprising:

an upwardly extending tower assembly defining a path down which the pipe passes as a pipeline is being J-laid by the vessel;

a lower guide arrangement for guiding the pipeline after it has passed down the tower, the lower guide arrangement including a plurality of sets of guide rollers spaced apart along the path of the pipeline and defining lateral limits of the path, the guide rollers being located such that they allow some bending of the pipeline so that the pipeline is less vertical as the pipeline passes through the lower guide arrangement than when the pipeline passes through the tower assembly upstream of the lower guide arrangement;

a plurality of sets of adjustable rollers for adjusting a position of the pipeline as it passes through the lower guide arrangement;

means for monitoring forces applied to the pipeline by the adjustable rollers;

piston and cylinder arrangements for operating the adjustable rollers; and a control station for receiving signals from the force monitoring means and for providing signals for the operation of the piston and cylinder arrangements for operating the adjustable rollers; wherein each of the sets of guide rollers defines a respective set diameter and the set diameters increase nonlinearly in the direction of travel of the pipeline during laying.

* * * * *

UNITED STATES PATENT AND TRADEMARK OFFICE
CERTIFICATE OF CORRECTION

| | |
|---|---|
| PATENT NO. | : 7,189,028 B1 |
| APPLICATION NO. | : 10/031411 |
| DATED | : March 13, 2007 |
| INVENTOR(S) | : Teresio Signaroldi et al. |

It is certified that error appears in the above-identified patent and that said Letters Patent is hereby corrected as shown below:

IN THE SPECIFICATION:

Please amend the paragraph in column 2, lines 49-56 as follows: should read

The invention of particular relevance to the laying of a relatively rigid pipeline rather than, for example, a pipeline that is so flexible it can be curved into reels for storage. Preferably the resistance of the bearings to resilient displacement is more than 100 kN/m, and more preferably more than 500 kN/m. In an embodiment of the invention described below, the resistance to displacement is of the order of [[500]] 5000 kN/m in the case of certain higher sets of rollers and of the order of 1000 kN/m in the case of certain lower sets of rollers.

Please amend the paragraph in column 3, lines 1- 10 as follows:

As will be appreciated, the amount of bending introduced into the pipeline during its passage through the lower guide arrangement may be small. One purpose of introducing the bend is to enable the horizontal forces between the guide rollers and the pipeline to be distributed evenly between the set of rollers. In an embodiment of the invention described below, the amount of bending of the pipeline is of the order of 0.34 m per 10 m length of pipeline; in that embodiment the total force applied by the lower guide arrangement under normal conditions is about [[100]] 1000 kN.

Please amend claim 16 as follows: Col. 12, Line 60 should read

16. A pipe-laying vessel for J-laying a pipe, the vessel comprising:

an upwardly extending tower assembly defining a path down which a pipe of a pipeline passes as the pipeline is being laid in a J-laying process by the vessel; and a lower guide arrangement for guiding the pipeline after it has passed down the tower, the lower guide arrangement being substantially trumpet shape, flaring outwardly in the direction of travel of the pipeline during laying, and the lower guide arrangement including a plurality of sets of guide rollers spaced apart along the path of the pipeline and defining the lateral limits of the path, and each of the sets of guide rollers defines a respective set diameter and the set diameters increase nonlinearly in the direction of travel of the pipeline during laying the guide rollers being located such that the pipeline is less vertical as the pipeline passes through the lower guide arrangement than when the pipeline passes through the tower assembly upstream of the lower guide arrangement; and

UNITED STATES PATENT AND TRADEMARK OFFICE
CERTIFICATE OF CORRECTION

PATENT NO. : 7,189,028 B1
APPLICATION NO. : 10/031411
DATED : March 13, 2007
INVENTOR(S) : Teresio Signaroldi et al.

It is certified that error appears in the above-identified patent and that said Letters Patent is hereby corrected as shown below:

Please amend claim 16 as follows (cont'd):

means for monitoring forces applied to the pipeline by rollers of the lower guide arrangement.

Signed and Sealed this

Eleventh Day of September, 2007

JON W. DUDAS
*Director of the United States Patent and Trademark Office*